United States Patent [19]

Uhing

[11] 4,203,511
[45] May 20, 1980

[54] DEVICE FOR MOVING OBJECTS ALONG A PREDETERMINED PATH

[76] Inventor: Joachim Uhing, Dorfstede 34, 2300 Molfsee üb Kiel, Fed. Rep. of Germany

[21] Appl. No.: 853,578

[22] Filed: Nov. 21, 1977

[30] Foreign Application Priority Data

Nov. 22, 1976 [DE] Fed. Rep. of Germany ....... 2653009

[51] Int. Cl.² ............................................ B65G 47/26
[52] U.S. Cl. ................................... 198/458; 104/166; 198/473
[58] Field of Search .............. 198/854, 473, 780, 472, 198/678, 786, 458; 104/166

[56] References Cited

U.S. PATENT DOCUMENTS

| 402,934 | 5/1889 | Judson | 104/166 |
| 3,850,280 | 11/1974 | Ohrnell | 198/678 X |
| 3,897,735 | 8/1975 | Watts | 104/166 |

FOREIGN PATENT DOCUMENTS 714323 7/1965 Canada ..................... 104/166

Primary Examiner—Robert B. Reeves
Assistant Examiner—Douglas D. Watts
Attorney, Agent, or Firm—Michael J. Striker

[57] ABSTRACT

A device for moving objects along a predetermined path comprises a rotatable shaft of circular cross-section extending along this path and a suspension arrangement comprising at least two rolls arranged displaced from each other in the circumferential direction of the peripheral surface of the shaft and frictionally engaging this peripheral surface, and a frame carrying the rolls with the axes thereof including an angle with the longitudinal axis of the shaft.

1 Claim, 16 Drawing Figures

FIG.10
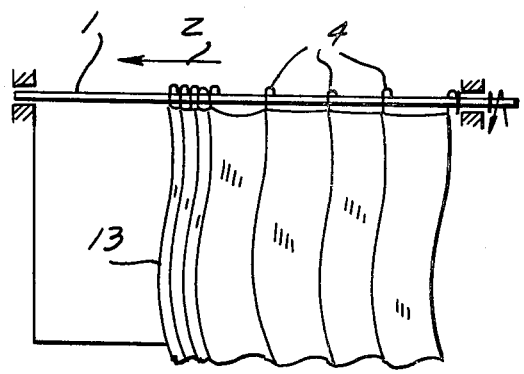
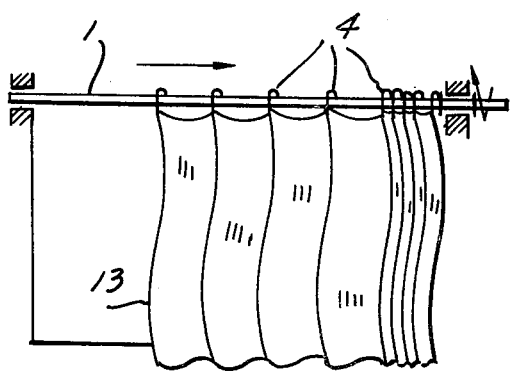
FIG.11

DEVICE FOR MOVING OBJECTS ALONG A PREDETERMINED PATH

BACKGROUND OF THE INVENTION

The present invention relates to a device for transporting objects along a guide rail, constructed as a rotating shaft of circular cross-section and which is in frictional engagement with roll bodies arranged in such a manner that the rotating movement of the shaft is translated in a longitudinal movement of the roll bodies along the shaft axis.

Such a device is already disclosed in the DT-PS No. 1,057,411. In this device turnable rings move along a shaft and in which the angle included between a plane of symmetry normal to the ring axis and the shaft axis determines the relationship between the number of revolutions of the shaft and the speed of movement of the rings along the shaft axis.

This known device is, however, only usable for relatively short shafts. In addition, the rings cannot be lifted from the shaft and special means are necessary to create the necessary contact pressure between the roll bodies and the shaft. Furthermore the contact pressures of the individual rings are located in different planes so that they produce onto the shaft often a detrimental bending moment. This known arrangement can also only be used for producing straight line movements.

SUMMARY OF THE INVENTION

It is an object of the present invention to provide a device for moving objects along a predetermined path and which avoids the above-mentioned disadvantages of such devices known in the art.

It is a further object of the present invention to provide a device of the afore-mentioned kind which permits to transport objects over large distances along a predetermined path, which may be a straight line or a curved path, in which a plurality of objects may be moved with the same, different or changeable speeds and in which the connection of the objects to be transported with the driving shaft can be accomplished by simple suspension.

With these and other objects in view, which will become apparent as the description proceeds, the device according to the present invention for transporting objects along a predetermined path mainly comprises a guide rail extending along the aforementioned path and being constituted by a rotatable shaft having a circular peripheral surface and suspension means for the objects comprising at least two rolls frictionally engaging the peripheral surface of the shaft and arranged displaced from each other in the circumferential direction of the latter, and means carrying the rolls with the axes thereof including an angle with the longitudinal axis of the shaft.

According to a further feature of the invention, the rolls are distributed on the peripheral surface of the shaft in such a manner that a sufficient frictional engagement between the rolls and the peripheral shaft surface is obtained by the weight of the aforementioned suspension means and that these suspension means, while being stably supported on the shaft, may easily be removed therefrom. The means carrying the rolls are preferably in the form of a hook-shaped frame extending only partly about the shaft so that the frame and the rolls thereon may be lifted from the shaft. In this way it is possible to support a long shaft intermediate the ends thereof by a slide bearing or by rollers arranged in such a manner so as to engage the shaft only at such portions thereof which are not engaged by the transporting rolls. The shaft itself may consist of a straight one-piece, or may be constructed of a plurality of sections, in which successive sections include an angle with each other, or the shaft may also be a curved shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 10–14 schematically illustrate the use of the device for folding and unfolding curtains in various positions and arrangements;

in FIGS. 15 and 16 the rolls, for simplification reason, are not shown in turned position.

DESCRIPTION OF THE PREFERRED EMBODIMENTS

Figure 1:
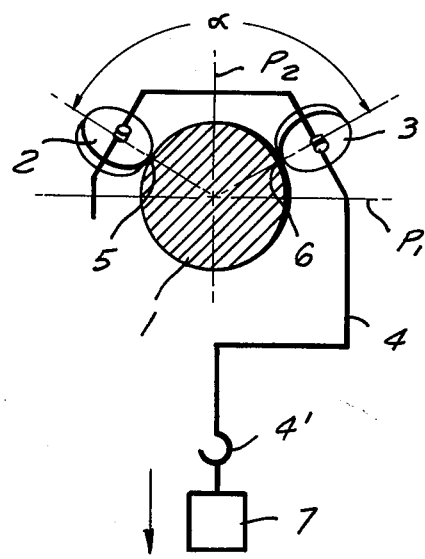
FIG. 1 is a cross-section through the shaft and suspension means mounted thereon.

Referring now to the drawing and more specifically to FIG. 1 of the same, it will be seen that the device according to the present invention for transporting objects along a predetermined path, may include a shaft 1 rotatable about its axis in the one or in the opposite direction and having a cylindrical peripheral surface. Suspension means, in form of a substantially hook-shaped frame 4, partially surround the shaft 1. A pair of rolls 2 and 3 are turnably mounted by the frame 4, displaced in circumferential direction of the peripheral surface of the shaft through an angle α. The axes of the rolls 2 and 3 are inclined through an acute angle β, as more clearly shown in FIG. 4, with respect to the shaft axis. The rolls 2 and 3 frictionally engage the peripheral surface of the shaft 1 substantially at points located above a horizontal plane $P_1$, passing through the shaft axis, and equally spaced from a vertical plane $P_2$, including the axis of the shaft 1. The lower end portion of the frame is in form of a hook 4', which is also located in the afore-mentioned vertical plane P₂. This will assure that the frame 4, the rolls 2 and 3 mounted thereon, as well as a load 7 carried by the hook 4' are stably supported on the peripheral surface of the shaft 1. Depending on the magnitude of the angle α a greater or smaller clamping action of the rolls 2 and 3 will be produced, and, correspondingly, the frictional moment which will be transmitted from the rotating shaft onto the rolls 2 and 3 will be changed. If only two rolls are provided on the frame the angle α should be smaller than 180°. By constructing the frame 4 in the manner as shown in FIG. 1, the frame with the rolls thereon may not only be easily lifted from the shaft 1, but the latter may also be properly supported between its ends and at portions thereof below the plane P₁, which is especially important if shafts of considerable lengths are used.

Figure 2:
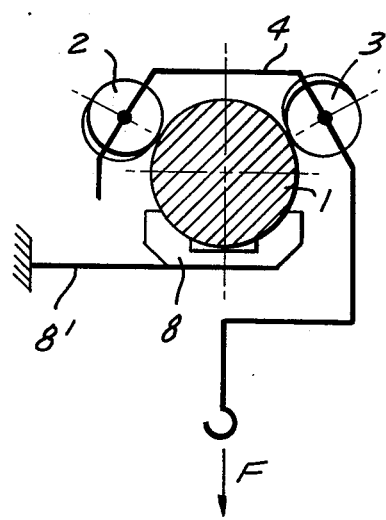
FIG. 2 is a view similar to FIG. 1 and showing in addition a slide bearing for supporting the shaft.

FIG. 2 shows an arrangement in which the shaft 1 is supported by a cup-shaped slide bearing 8, which supports the shaft 1 beneath the plane P₁, that is at portions of the peripheral surface of the shaft which are not engaged by the rolls 2 and 3. The bearing 8, in turn, is supported by an arm 8', one end of which is fixed to a stationary support.

Figure 3:
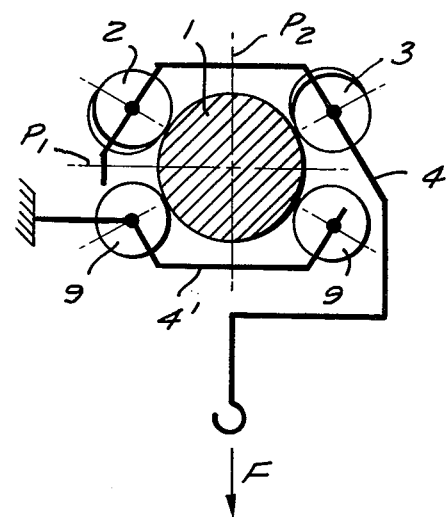
FIG. 3 is a view similar to FIG. 2 and showing rollers for supporting the shaft.

FIG. 3 illustrates another support arrangement for the shaft 1, which includes a pair of rolls 9 symmetrically arranged with respect to the vertical plane P₂ and below the horizontal plane P₁. The rolls 9 have axes parallel to the shaft axis and are rotatably supported on a frame 9', one end of which is fixed to a stationary support. A plurality of supports as shown in FIGS. 2 and 3 may be arranged spaced from each other along the longitudinal extension of the shaft. Such supports may for instance be provided at distances of 0.8 to 1.2 meters from each other and in this case the diameter of the shaft may be held to only 12 millimeters.

Figure 4:
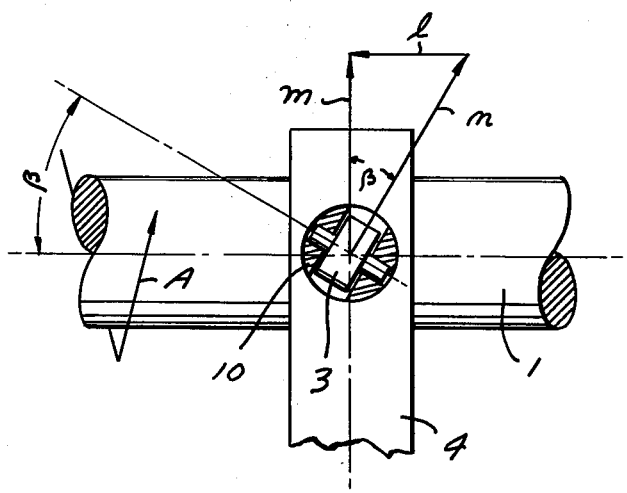
FIG. 4 is a partial side view of the device shown in FIG. 1 and showing the mounting of one of the rolls in the means for carrying the same.

The rotating shaft 1 moves the frame 4, together with an object suspended thereon, with a speed which depends, on the one hand, on the speed of rotation of the shaft 1 and, on the other hand, on the angle β included between the shaft axis and the axes of the rollers 2 and 3. This relationship may now be explained on hand of FIG. 4. As shown in FIG. 4 each of the rolls 2 and 3, as illustrated for the roll 3 in FIG. 4, is mounted in a bushing 10, arranged in a corresponding opening of the frame 4, for turning about its axis, which includes with the axis of the shaft 1 an angle β. Assuming the shaft is rotated in a direction as indicated by the arrow A, the magnitude and direction of movement of the frame 4 in the direction of the shaft axis can be determined by the resultant 1 of the two components m and n respectively indicating the magnitude and direction of rotation of the shaft and the roller 3. It will be obvious that if the angle β is increased, the speed of movement of the frame in the longitudinal direction of the shaft will likewise be increased, and it will be also obvious that if the direction of rotation of the shaft 1 is reversed, or if the shaft of the roller 3 is turned through an angle of 90°, the direction of movement of the frame 4 along the shaft 1 will also be reversed. The bushing 10 may be press fitted into a corresponding opening of the frame 4, so that the angle β may not be changed, or the bushing 10 may be turnably arranged in the opening of the frame 4, so as to change the angle β and the bushing may then be held in any adjusted position by a set screw or the like, not shown in the drawing.

It is therefore possible, if a plurality of suspension means are mounted on the shaft, in which the axes of the rolls on the plurality of frames include the same or different angles with the shaft axis, to move the plurality of frames with the same or different speeds along the shaft and in the same or in opposite direction. It is also possible, by changing the direction of rotation of the shaft, to reverse the direction of movement of the frames. If the number of revolutions of the shaft and/or the mentioned angle β are made adjustable, then the course of the movement of the frames may be varied to a considerable extent. For instance the speed of movements of the frames may be made dependent on the length of the path they have respectively to be moved, or the speed of movement of the frames in opposite direction along the shaft may be chosen differently. It is also possible to provide on each bushing 10 (FIG. 4) a laterally projecting arm cooperating with a stationary stop to turn upon engagement of arm and stop the respective bushing 10 about its axis in such a manner that the angle β becomes zero and movement of the frame 4 is stopped. In such an arrangement it is evidently necessary that the bushing 10 and the opening in which the bushing is turnably mounted are provided with appropriate shoulders or stops preventing turning of the bushing beyond a position in which the angle β is reduced to zero.

Figure 5:
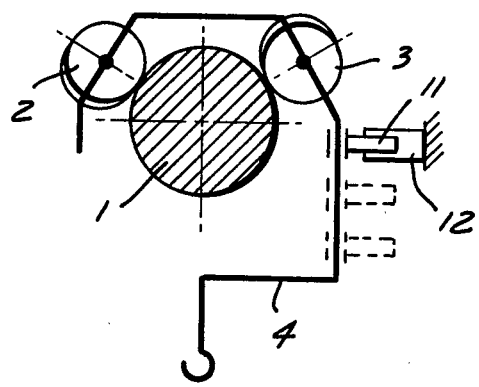
FIG. 5 is a view similar to FIG. 1 and showing in addition adjustable stop means provided on the carrying frame.

It is also possible to stop the frames 4 at selected points along the shaft 1 by providing on each frame stop means in form of a lateral projecting pin 11 cooperating with a stationary stop 12, as shown in FIG. 5. By making the stop 11 on the frame movable to a plurality of positions, as indicated in dotted lines in FIG. 5, the stops 11 on successive frames may be brought to different positions, each cooperating with a stationary stop 12 also arranged at a different elevation, so that a plurality of frames 4 may be stopped at different stations along the shaft 1. The stops 11 may also be constructed, in a manner known in the art and not forming part of the present invention, in such a manner that, upon engagement with the stationary stop, any load supported on the end portion of the frame is discharged therefrom.

Figure 6:
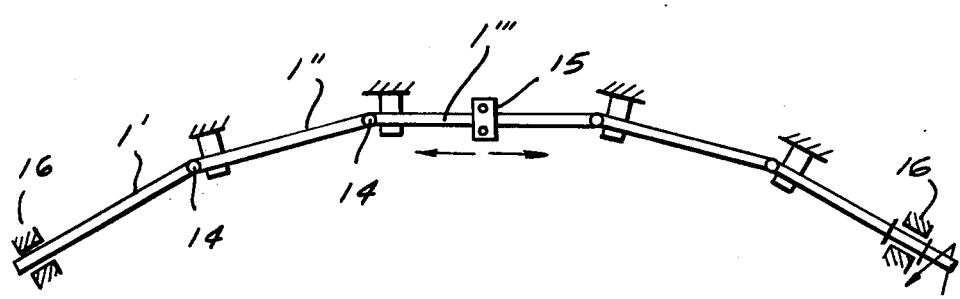
FIG. 6 is a top view schematically illustrating a shaft composed of a plurality of shaft sections.

A further advantage of the device according to the present invention is that in order to produce the necessary frictional engagement between the rolls 2 and 3 and the peripheral surface of the shaft 1 no additional elastic forces, for instance spring forces, are necessary. The shaft 1 may be formed from steel, other metals, or plastic material, whereby the shafts may be solid or in tubular form and be produced with large tolerances. The surface quality of the shaft is not of great importance, the surface may be smooth or rough. Essential is only that the friction coefficient between shaft and rolls is greater than 0.1. Since the rolls have a certain width, they can, during rolling on the peripheral surface of the shaft, also cross without any difficulties grooves, holes, etc. provided in the peripheral shaft surface. This permits to construct the shaft from a plurality of shaft sections 1', 1'', 1''' and so on, which may include obtuse angles with each other, as illustrated in FIG. 6. The individual shaft sections may be connected to each other by universal joints 14, interengaging driver pins, wire spirals, or the like for simultaneous rotation about their axes. Essential in such a construction is only that the connections between successive shaft sections are dimensioned in such a manner that they do not essentially protrude beyond the diameters of the shaft sections and that they do not form between adjacent ends of this shaft section empty spaces which are greater than the width of the rolls 2 and 3. The individual shaft sections may be supported by support means such as illustrated in FIGS. 2 and 3. If the various frames, not shown in FIG. 6, should be movable from a center of the shaft composed of the plurality of shaft sections to opposite ends of the shaft, as indicated by the arrows 5 shown in FIG. 6, and again to the center by reversing the direction of rotation of the shaft, then the central shaft section, shown in FIG. 1 as the section 1''', may also be supported by a standard bearing 15 surrounding the shaft.

Figure 7:
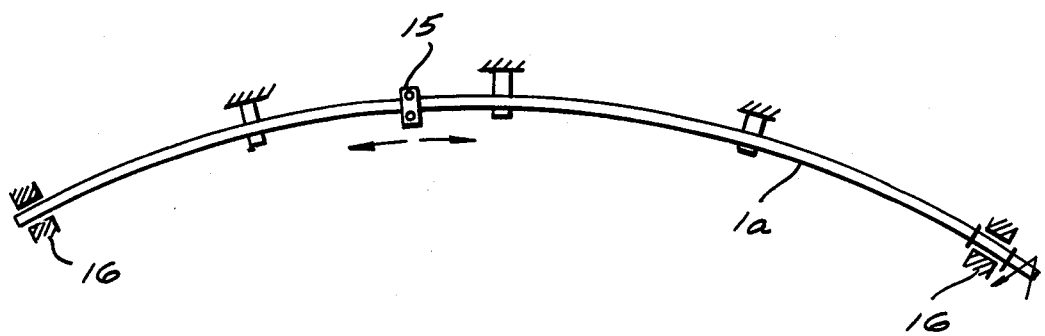
FIG. 7 illustrates a top view of a curved shaft.

Instead of a rigid shaft or a shaft composed of a plurality of rigid shaft sections, it is also possible to use a shaft 1a which is curved along an arc, as illustrated in FIG. 7. The shaft 1a has to be constructed, in the manner well known in the art, to be also turnable about its axis in its curved condition and for this purpose elastic shafts, tubular shafts from plastic material or other bendable shafts may be used, which are supported at opposite ends by standard bearing 16 and in the center thereof also preferably by a standard bearing 15, which may be a sleeve bearing or roller bearing encompassing the peripheral surface of the shaft. Intermediate the bearings 16 and 15 the shaft may be supported at a lower portion thereof in the manner as illustrated in FIGS. 2 and 3. It is also possible to bend the shaft 1a in such a manner that the opposite shaft ends are arranged closely to each other, in fact it is possible to construct a shaft composed of a plurality of shaft sections, as shown in FIG. 6, in such a manner that the shaft sections form a closed polygon.

Figure 8:
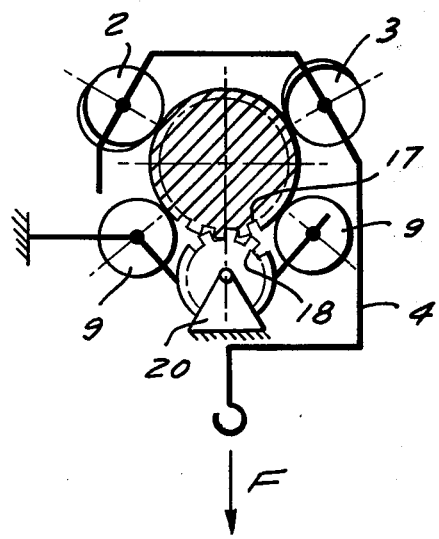
FIG. 8 is a view similar to FIG. 3 and showing in addition means for rotating the shaft about its axis.
Figure 9:
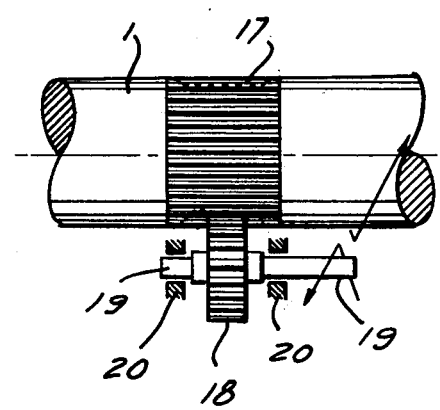
FIG. 9 is a side view of the device shown in FIG. 8, in which for simplification reason the suspension means with the rolls thereon as well as the roller support for the shaft are omitted.

The rotation of any of the shaft constructions shown may be carried out by a drive arrangement as illustrated in FIGS. 8 and 9. Such a drive arrangement may be provided at one end of the respective shaft, or along a plurality of portions along the shaft axis. For this purpose the shaft 1, or a shaft section as shown in FIG. 6, or a curved shaft as shown in FIG. 7, may be provided with one or a plurality of gear portions 17, machined into the shaft so that the teeth do not project beyond the peripheral surface thereof and the teeth of the gear portion 17 are engaged by the teeth of a pinion 18, having a shaft 19 turnably mounted in bearings 20, as shown in FIGS. 8 and 9. An end portion 19' of the shaft 19 projects beyond the corresponding bearing 20 and may be coupled to a pre-reversible and speed adjustable electromotor, not shown in the drawing. On the other hand, a chain gear may also be keyed to the projecting shaft portion 19', which may be driven by a chain engaging the chain gear and the chain support, whereas the various frames 4 move with the same speed toward the left, as viewed in FIG. 10, while transversing different distances, until the curtain 13 is completely opened. The curtain portion between the fixed right end thereof and the frame 4 closely adjacent thereto is thus first unfolded, whereafter this frame is now held stationarily, while the rolls thereon slide on the shaft and while the following curtain portions open one after another in the same manner, as shown in FIG. 10.

When the various frames are thus arrested one after the other, the rolls carried thereby slide on the peripheral surface of the shaft 1, that is they do not roll on the peripheral surface. This will increase the necessary moment for turning the shaft 1 about its axis, which, however, may be acceptable in most of the cases. If the curtain 13 has again to be folded, the direction of rotation of the shaft has to be reversed, as indicated in FIG. 11, and the above-described operation proceeds in the reverse sequence.

Figure 12:
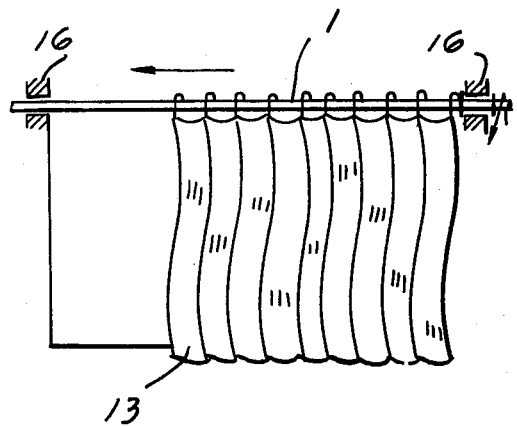
Figure 13:
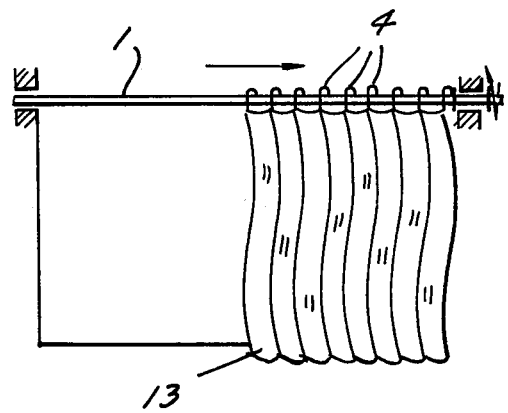

Another way of opening or closing the curtain 13 is illustrated in FIGS. 12 and 13. In this arrangement the axes of the rolls 2 and 3 on successive frames 4 do not include with the longitudinal axis of the shaft 1 the same angle $\beta$, but the roll axes on successive frames 4 are adjusted in such a manner that the angle $\beta$ may be driven in the one or the other direction by hand or by reversible motor in a manner well known in the art.

If a plurality of frames 4 which have to be moved simultaneously are mounted on the shaft 1, as is for instance necessary with curtains which have to be suspended, then there are different possibilities for moving the frames. These various possibilities are schematically illustrated in FIGS. 10-14. As shown in these Figures the curtain 13 is suspended at portions thereof spaced in the extended position of the curtain 10-15 centimeters from each other by frames 4 as described above, whereby for simplification reason the rollers 2 and 3 are not indicated on the schematically illustrated frames 4 hung on the shaft 1, which may be supported at opposite ends by conventional bearings and be rotated about its axis in the manner as described above. If the rolls 2 and 3 are mounted on their respective frames in such a manner that the axes of the rolls on all frames include with the longitudinal axis of the shaft 1 the same angle $\beta$, then all of the frames move, during rotation of the shaft 1 in the direction as indicated in FIG. 10, with the same speed in the direction of the arrow Z, until the curtain 13 is completely unfolded. One end of the curtain 13, shown in FIG. 10 at the right end, is fixedly attached in any known manner to a stationary on successive frames 4 increases from the frame 4 adjacent to the right, fixed end of the curtain 13 toward the other end thereof. This will assure that during rotation of the shaft 1 in the direction as indicated in FIG. 12, all of the frames 4 start their movement at the same time, but successive frames move with increasing speeds, which is preferably obtained by adjusting the angle $\beta$ in the successive frames 14 in such a manner that all of the frames 14 reach their end position simultaneously. If the direction of the shaft 1 is now reversed, as indicated in FIG. 13, the procedure as described in connection with FIG. 12 occurs in reverse sequence.

The necessary drive energy for turning the shaft 1 is smaller with the arrangement shown in FIGS. 12 and 13 than with the arrangement shown in FIGS. 10 and 11, since during the movement thereof the rolls 2 and 3 on the various frames 4 roll on the peripheral surface of the shaft 1 and do not slide on the same.

Figure 14:
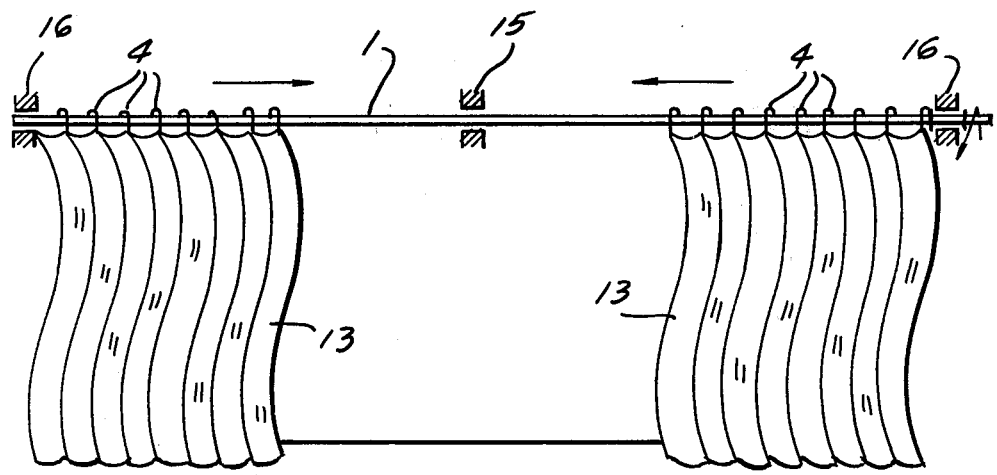

FIG. 14 shows an arrangement in which two curtains 13 may be moved towards each other during rotation of the shaft 1 in the direction as indicated in this Figure. It is to be understood that in this arrangement the axes of the rolls on the frames 4 on the right curtain 13 respectively include with the shaft axis angles which are turned through 90° with respect to the included angle between the roll axes and the shaft axis on the left curtain. Thereby the rolls on successive frames 4 are preferably arranged in the manner as described in connection with FIGS. 12 and 13.

An advantage of the arrangement shown in FIGS. 10-14 is that the various frames may be attached to successive portions of the curtain 13 and subsequentaly thereto the frames may be suspended on the shaft 1 or easily removed therefrom, whereby neither the shaft 1 has to be removed from its bearings or the drive means for the shaft to be disconnected therefrom. A further advantage is that the curtains do not necessarily be moved by rotation of the shaft 1, but they may also be opened or closed by hand in a usual manner.

As already mentioned above, it is not necessary to rotate the shaft by a motor, but the shaft may also be rotated by hand, for instance by a crank, with or without transmission between the crank and the shaft. Different hand operated drive means, well known in the art, may also be used for rotating the shaft.

Figure 15:
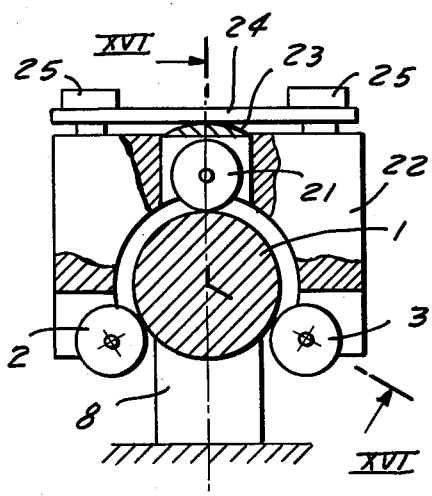
FIG. 15 is a partially sectioned front view of a different embodiment which is provided with three rolls.
Figure 16:
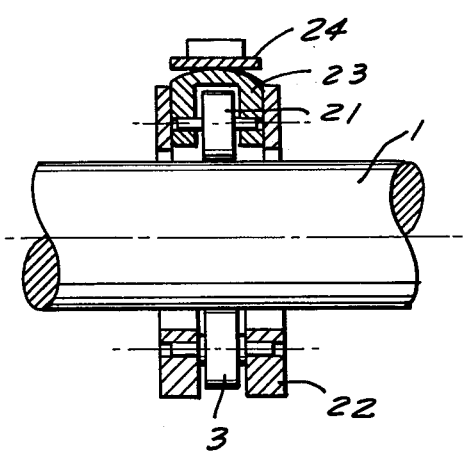
FIG. 16 is a cross-section taken along the line XVI—XVI of FIG. 15.

If it is necessary to provide a relatively large pushing force on the suspension means according to the present invention, or when gravity cannot be used to provide the necessary frictional engagement between the peripheral surfaces of shaft and rolls, as is for instance the case when the shafts are vertically arranged, then it is possible to increase the frictional engagement by elastic forces. This can be obtained if three or more rolls are uniformly distributed about the peripheral surface of the shaft. Arrangement of three or more rolls in one plane are known in the art. However, these known arrangements may be used only in connection with relative short shafts which are turnably supported only at opposite ends thereof. With long shafts which must also be supported between the opposite ends thereof, in the manner as for instance illustrated in FIGS. 6 and 7, closed frames for supporting three or more rolls are not usable. However, a construction in which each of the suspension means includes three rolls, as shown in FIGS. 15 and 16, may also be used in connection with long shafts which are supported intermediate the ends thereof. The arrangement as illustrated in FIGS. 15 and 16 includes a frame or block 22, partially encompassing the circumference of the shaft 1 and provided at the lower ends thereof with slots in which the rolls 2 and 3 are turnably mounted. As clearly shown in FIG. 15, the two rolls 2 and 3 are located in this arrangement below a horizontal plane passing through the axis of the shaft 1. The upper portion of the block 22 is provided with a vertically extending cutout in which a cup-shaped member 23 is movable in vertical direction and in which the third roller 21 is turnably mounted. The member 23 projects with a part-spherical portion beyond the upper surface of the block 22 and this spherical portion is engaged by a leaf spring 24, held in tensoined condition by a pair of screws 25 threaded in corresponding openings of the block 22. In this way the peripheral surfaces of the rolls 2, 3 and 21 are resiliently pressed by the leaf spring 24 against the peripheral surface of the shaft 1, to thereby increase the frictional engagement between these surfaces. It is to be understood, that also in this construction the axes of the three rolls have to include, as described above, an angle $\beta$ with the shaft axis, but for simplification reasons the turned position of the roller axes with respect to the shaft axis is not shown in FIGS. 15 and 16. As also clearly shown in FIG. 15 the shaft may be supported intermediate its ends and between the rolls 2 and 3 by support means 8, which may be constructed for instance similar to the construction as shown in FIG. 2.

It will be understood that each of the elements described above, or two or more together, may also find a useful application in other types of devices for moving objects along a predetermined path differing from the types described above.

While the invention has been illustrated and described as embodied in a device for moving objects along a predetermined path defined by a rotatable shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for moving a curtain between an open and a closed position comprising an elongated rotatable shaft having a circular peripheral surface; means for rotating the shaft in one and in an opposite direction; and a plurality of suspension means arranged spaced from each other along and suspended on said shaft and each comprising at least two rolls frictionally engaging said peripheral surface and arranged displaced from each other in the circumferential direction of said peripheral surface and a hook-shaped frame extending only partly about said shaft and carrying said rolls with the axes thereof including fixed angles with the longitudinal axis of said shaft, said frame having a lower end portion below and vertically aligned with the shaft axis and ending in a hook so that successive portions of a curtain may be connected to the hooks of successive suspension means and the curtain be moved between an open and a closed position during rotation of said shaft in the one and the opposite direction, the axes of the rolls on successive suspension means including with the shaft axis an angle which increases from one to the next suspension means so that successive suspension means move during rotation of said shaft with increasing speeds.

* * * * *